United States Patent
Pong et al.

(10) Patent No.: US 9,445,172 B2
(45) Date of Patent: Sep. 13, 2016

(54) HEADPHONES WITH INTERACTIVE DISPLAY

(71) Applicants: Ronald Pong, To Kwa Wan (HK); King Hei Liu, Po Sheung Tsuen (HK)

(72) Inventors: Ronald Pong, To Kwa Wan (HK); King Hei Liu, Po Sheung Tsuen (HK)

(*) Notice: Subject to any disclaimer, the term of this patent is extended or adjusted under 35 U.S.C. 154(b) by 244 days.

(21) Appl. No.: 13/956,913

(22) Filed: Aug. 1, 2013

(65) Prior Publication Data

US 2014/0036127 A1 Feb. 6, 2014

Related U.S. Application Data

(60) Provisional application No. 61/678,955, filed on Aug. 2, 2012.

(51) Int. Cl.
  *H04R 1/10* (2006.01)
  *H04R 1/02* (2006.01)
  *H04R 25/00* (2006.01)

(52) U.S. Cl.
  CPC ............ *H04R 1/028* (2013.01); *H04R 1/1058* (2013.01); *H04R 1/1091* (2013.01); *H04R 1/1008* (2013.01); *H04R 2460/07* (2013.01)

(58) Field of Classification Search
  CPC ...... H04R 5/033; H04R 1/1066; H04R 1/10; H04R 1/105; H04R 1/028
  USPC ................................................... 381/74, 370
  See application file for complete search history.

(56) References Cited

U.S. PATENT DOCUMENTS

| 5,076,281 | A | * | 12/1991 | Gavish | 600/534 |
| 5,497,427 | A | * | 3/1996 | Nageno | 381/381 |
| 2009/0097689 | A1 | * | 4/2009 | Prest et al. | 381/380 |
| 2009/0323975 | A1 | * | 12/2009 | Groesch | 381/71.1 |
| 2011/0096939 | A1 | * | 4/2011 | Ichimura | 381/74 |
| 2011/0134016 | A1 | * | 6/2011 | Foxenland | 345/8 |
| 2013/0120458 | A1 | * | 5/2013 | Celebisoy et al. | 345/649 |
| 2013/0136293 | A1 | * | 5/2013 | Lee | H04R 1/10 381/378 |

FOREIGN PATENT DOCUMENTS

| CN | 101627638 | 1/2010 |
| CN | 201616894 U | 10/2010 |
| CN | 102421046 A | 4/2012 |

* cited by examiner

Primary Examiner — Paul S Kim
Assistant Examiner — Norman Yu
(74) Attorney, Agent, or Firm — Larry E. Henneman, Jr.; Gregory P. Gibson; Henneman & Associates, PLC

(57) ABSTRACT

A novel headphone system includes a first speaker assembly, a second speaker assembly, and an interactive visual display system. The interactive visual display system includes a display operative to output visual contents according to interaction with a user. In a more particular embodiment, the headphone system includes an external device interface that enables a user to interact with the contents displayed from the screen via an external device or via the Internet. In another embodiment, the interactive visual display system is removable from the rest of the headphone system and can optionally be installed in another compatible non-headphone device.

52 Claims, 6 Drawing Sheets

HEADPHONES WITH INTERACTIVE DISPLAY

CROSS-REFERENCE TO RELATED APPLICATIONS

This application claims the benefit of U.S. Provisional Application Ser. No. 61/678,955, filed Aug. 2, 2012 and having at least one common inventor, which is incorporated by reference herein in its entirety.

BACKGROUND OF THE INVENTION

1. Field of the Invention

This invention relates generally to audio electronics, and more particularly to audio headphones.

2. Description of the Background Art

As consumer electronics become more and more commonplace in modern society, the demand for personal audio headphones continues to increase. In response to the increasing demand, there has been a recent surge in the design and development of headphones. Indeed, headphone developers continuously seek new and improved designs and features that appeal to consumers.

One approach to making a product more appealing to consumers has been to incorporate some type of aesthetic feature into the headphone design. For example, some designs include interchangeable color/design plates that allow a user to customize the appearance of the headphones. Other designs include light emitting diode (LED) systems that add aesthetic appeal to the headphone.

Although both design approaches add to the overall aesthetics of headphones, both have their disadvantages. For example, headphones with interchangeable color/design plates are limited in that they can only display content (e.g., color, pattern, image, etc.) that is available on the interchangeable color/design plates. Similarly, LED systems typically only display predetermined lighting schemes which, again, are limited to those made available by the manufacturer of the LED system.

What is needed, therefore, is a headphone system that is capable of displaying content defined by a user.

SUMMARY

Aspects of the present invention provide a headphone system that is capable of interactively displaying content either defined by a user or by other parameters including, but not limited to, GPS location, motion of the user, sound, voices, images in the vicinity, and/or commands from authorized Internet sites or nearby devices via wireless communications. Ultimately, users can use their own brain waves to control the headphone display interactively.

Aspects of the present invention improve on the prior art and transform headphones into a sophisticated interactive display platform, in addition to reproducing music and sound. As a result, the headphones of this invention can also be a useful tool for a user to publicly express his/her feelings to peers in close proximity via the headphone display in the form of static, animated or interactive images or videos.

An objective of the present invention is to provide a portable and interchangeable display platform which could be worn over the head. The contents of the display can be programmable and/or be interactive with a separate external controlling device (e.g. Smartphone or Tablet) nearby. One advantage of the display is that it can provide a visual attraction and/or communications to people around it.

An example embodiment of the present invention puts the portable and/or interchangeable display platform on the two sides of the headphones and on the headband that holds the headphones together. The three displays, one on the left headphone, one on the right headphone, and one on the headband, form an integrated interactive display platform. Another example embodiment includes only the headband display, or the left and right headphone display. Such embodiments would simplify the implementation and reduce the cost of the interactive display headphones.

The headphones and the display platform of an example embodiment have a link to an external standalone controlling device. This external controlling device can supply the necessary audio signal for the headphones to play and to deliver a proper video or static/animated image signal for the display platform to display. This link can be a physical link (e.g., physical wires) or a wireless link (e.g., Bluetooth, ZigBee, Wi-Fi, NFC, 3G/4G, etc.) connecting to the external device. This external device can also be used for turning on/off and/or to configure various functions such as noise cancellation, loudness control, spectrum equalizer or other signal processing functions that the headphones may have.

The display platform, similar to a microcomputer, has its own central processing unit (CPU), memory, storage and necessary interfaces to perform the display functions based on the information and instructions sent by the external device via the link connecting the controlling device and the headphone/display platform. The contents sent over the link may be stored in the internal storage first and then displayed in a way determined by the instructions sent. If a camera is installed in the display platform, the display can also show video or images captured by the camera. If "touch screen" input function is available on the display, it can be used to control various headphone functions, such as noise cancellation, adjustment of frequency responses and other signal processing functions. A gyroscope can be included in the display platform so that the orientation of the display can be adjusted automatically depending on the orientation of the head of the user. Global positioning system (GPS) information supplied by a sensor built inside the headphones or by the external controlling device allows the display and/or headphones to present location sensitive sound/voice, images or videos. A Motion Sensor built in the headphones detects the motion of the user which could allow the display to be interactive with the user's motion.

An example headphone system includes a frame having a first region, a second region, and an intermediate region. The system additionally includes a first speaker assembly coupled to the first region of the frame, a second speaker assembly coupled to the second region of the frame, a display coupled to the frame, a controller coupled to the frame, and memory. A user interface is operative to receive input from a user. The memory stores data and code, and the controller is responsive to the user input, and operative to execute the code and display images on the display based at least in part on the user input.

In an example embodiment, the user interface includes a data communication interface operative to facilitate data communication between the headphone system and an external system. In addition, the user interface includes an input sensor coupled to the frame. The controller responsive to input from the input sensor is operative to provide control signals to the external device via the data communication interface.

Optionally, the controller is operative to control the headphone system based at least in part on instructions received from the external system via the data communication interface. In an example embodiment, the data communication interface is configured to receive audio control instructions, display control instructions, and/or camera control instructions (where the headphone system includes a camera) from the external system. The controller and the communication interface facilitate real-time control of the headphone system by the external system.

In an example embodiment, the data communication interface is configured to communicate with the external system via a wired connection. Optionally, the data communication interface includes a short-range or long-range wireless system configured to communicate with the external system.

The data communication interface is configured to receive audio signals from the external system and the first speaker assembly is operative to output sound indicative of the audio signals in real-time. Optionally, the controller is configured to receive digital audio data via the data communication interface and to store the digital audio data in the memory. As another option, the data communication interface is configured to receive display signals from the external system, and the controller is configured to display images on the display based on the display signals in real-time. As yet another option, the controller is configured to receive display data via the communication interface and store the display data in the memory.

In an example embodiment, the controller, the memory, and the display are embodied in a first detachable display unit, which is removably coupled to the frame by mounting the unit to the first speaker assembly. In a particular embodiment, the first speaker assembly includes a first electrical contact, and the first detachable display unit includes a complementary second electrical contact. The first electrical contact and the complementary second electrical contact are adapted to electrically contact one another. The first detachable display unit is adapted to rotate relative to the first speaker assembly about an axis when the first detachable unit is attached to the first speaker assembly. One of the first electrical contact and the complementary second contact includes a substantially annular (or arc-shaped) electrical conductor formed at least partially about the axis, and the annular conductor is adapted to slidably engage the other of the first electrical contact and the complementary second electrical contact while the first detachable display unit is being rotated with respect to the first speaker assembly. The other of the first electrical contact and the complementary second electrical contact is a conductive biasing member adapted to exert force on the annular conductor, the force being sufficient to maintain electrical contact with the annular conductor while the first detachable display unit is being rotated with respect to the first speaker assembly. In a particular embodiment, the first speaker assembly includes a first thread set and the first display unit includes a complementary second thread set. The first thread set and the second thread set facilitate the engagement of the display unit with the first speaker assembly.

Optionally, the headphone system additionally includes a second detachable display unit having a second display, and the display and the second display are cooperatively controlled by the controller. In a particular embodiment, the first detachable display unit is adapted to engage the first speaker assembly (e.g., coupled to the frame via the first speaker assembly), and the second detachable display unit is adapted to engage the second speaker assembly (e.g., coupled to the frame via the second speaker assembly). In a more particular embodiment, the headphone system further includes a third display unit having a third display, and the third display unit is mounted to the intermediate region of the frame. The display, the second display, and the third display are cooperatively controlled by the controller.

The controller can be operative to display static content or video on the display.

Optionally the headphone system additionally includes a camera coupled to the frame.

In an example embodiment, the user interface includes an input sensor coupled to the frame, and the controller is operative to control the headphone system based at least in part on input from the input sensor. For example, the controller can display images on the display based at least in part on the input from the input sensor. As another example, the controller can control the operation of at least one of the first speaker assembly and the second speaker assembly based at least in part on the input from the input sensor. In embodiments that include a camera, the controller can control the operation of the camera based at least in part on the input from the input sensor.

The input sensor can include a sound sensor (e.g., a microphone), an orientation sensor (e.g., a gyroscope, a tilt sensor, etc.), and/or a motion sensor (e.g., a gyroscope, an accelerometer, an inclinometer, etc.). The input sensor can also include a manual user input device (e.g., a touch-screen display, buttons, etc.).

In a particular embodiment, the input sensor generates output indicative of the orientation of the display, and the controller is configured to automatically adjust the orientation of images displayed on the display based at least in part on the output of the input sensor. In addition, the controller responsive to signals from the input sensor can provide control instructions to the external device, whereby a user can control the external device via the headphone system. The control instructions can include, but are not limited to, audio instructions (e.g., volume up, volume down, next selection, etc.). The headphone system can also include a location determining device (e.g., a GPS device), and the controller can use signals from the GPS device to perform location based operations.

A method for manufacturing headphones is also disclosed. An example method includes providing a frame having a first region, a second region, and an intermediate region. The method also includes coupling a first speaker assembly to the first region of the frame and coupling a second speaker assembly to the second region of the frame. The method continues by assembling a user interface, memory, a display and a controller into a display unit and coupling the display unit to the frame.

BRIEF DESCRIPTION OF THE DRAWINGS

The present invention is described with reference to the following drawings, wherein like reference numbers denote substantially similar elements.

DETAILED DESCRIPTION

The present invention overcomes the problems associated with the prior art, by providing a headphone system having an interactive display system. In the following description, numerous specific details are set forth (e.g., type of display screen, display contents, particular sensor types, etc.) in order to provide a thorough understanding of the invention. Those skilled in the art will recognize, however, that the invention may be practiced apart from these specific details. In other instances, details of well-known headphone manufacturing and electronic device assembly practices have been omitted, so as not to unnecessarily obscure the present invention.

Figure 1:
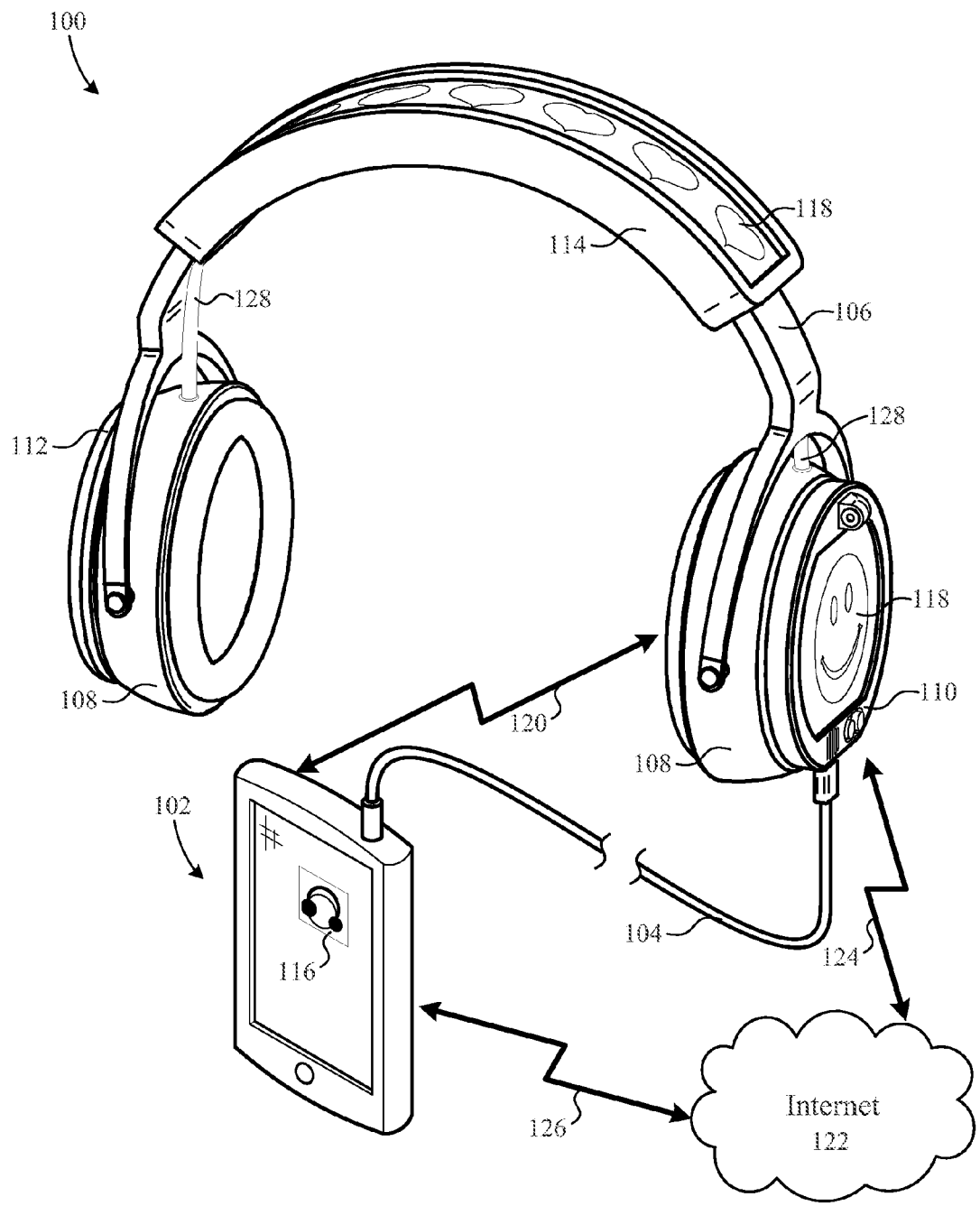
FIG. 1 is a perspective view of a headphone system connected to an external device via a data cable.

FIG. 1 is a perspective view of a headphone system 100 connected to an external device 102 via a wire 104. Headphone system 100 includes a frame 106 that supports a set of speaker assemblies 108 and an interactive visual display system which, in the example embodiment, includes a first display unit 110, a second display unit 112, and a third display unit 114. In this example, display units 110 and 112 are removable from headphone system 100 such that they can be interchanged with other display units that are universally adapted to mount on headphone system 100. Unlike units 110 and 112, unit 114 is a non-removable part of headphone system 100 in this embodiment. However, any of units 110, 112, and/or 114 can be interchangeable or integral parts of headphone system 100 without departing from the main scope of the present invention.

External device 102 is, for example, a smart phone equipped with an application 116 that enables a user to control and interact with headphone system 100. For example, visual contents 118 displayed by units 110, 112, and 114 can be controlled and interacted with in real-time via user I/O devices (e.g., touchscreen, trackball, orientation sensor, microphone, acceleration sensor, etc.) and/or other devices (e.g., GPS location determining system) of external device 102 when application 116 is operating. With application 116 operating, the audio contents output from speaker assemblies 108 can also be controlled and interacted with in real-time via user I/O devices of external device 102. Additionally, audio and display content can be preloaded into one or more of units 110, 112, and/or, 114 from external device 102 using application 116.

Wire 104 is, for example, a universal serial bus (USB) that provides a wired link through which data is communicated between headphone system 100 and an external device (i.e. external device 102). Optionally, a conventional auxiliary audio type cable could be used in place of wire 104.

Headphone system 100 is also adapted for short-range or long-range wireless communication with external devices that have wireless communication capabilities. For example, headphone system 100 is adapted to communicate with external device 102 via a short-range wireless link 120. As another example, headphone system 100 can be configured to communicate with external device 102 via a 3G/4G wireless connection, which is not short-range. As yet another example, headphone system 100 is adapted to communicate over the internet 122 via a wireless link 124. Likewise, external device 102 is also adapted to communicate over the internet 122 via a wireless communication link 126.

Display unit 110 provides control signals to display units 112 and 114 via a control cable/bus 128. Optionally, display units 110, 112, and 114 can communicate wirelessly.

Figure 2:
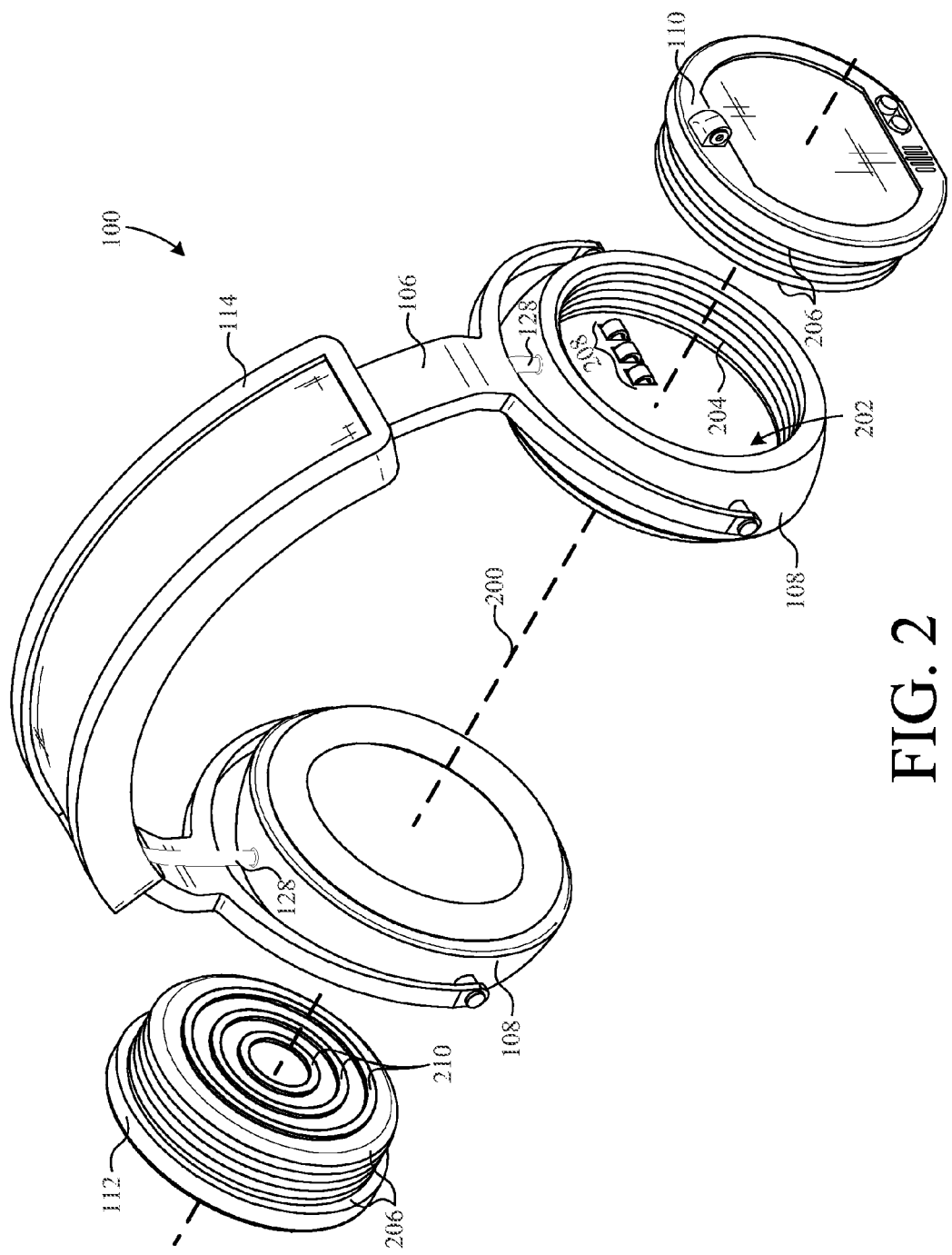
FIG. 2 is an exploded perspective view of the headphone system of FIG. 1.

FIG. 2 shows a perspective view of units 110 and 112 exploded from headphone system 100 along an axis 200. Each of speaker assemblies 108 defines a recess 202 that is adapted to receive a respective one of units 110 and 112. Furthermore, each recess 202 defines a set of internal threads 204 and a set of electrical contacts 208. Internal threads 204 are adapted to mate with a respective complementary set of external threads 206 formed on units 110 and 112. Electrical contacts 208 include, for example, three (or more) conductive spring elements formed in each of recesses 202. Each set of contacts 208 are adapted to slidably engage a complementary set of three concentric annular (or arc-shaped) electrical contacts 210 formed on the bottom side of units 110 and 112. When units 110 and 112 are threaded into recesses 202, each of contacts 210 slidably engage a respective one of contacts 208 thus establishing an electrical connection therebetween. When compressed, the spring characteristics of contacts 208 not only help to establish an electrical connection with contacts 210 but also provide a biasing force that secures units 110 and 112 into recesses 202. It should be recognized that as long as units 110 and 112 are threaded far enough into recesses 202, contacts 208 and 210 remain in contact with one another regardless of the orientation of units 110 and 112 about axis 200.

Figure 3:
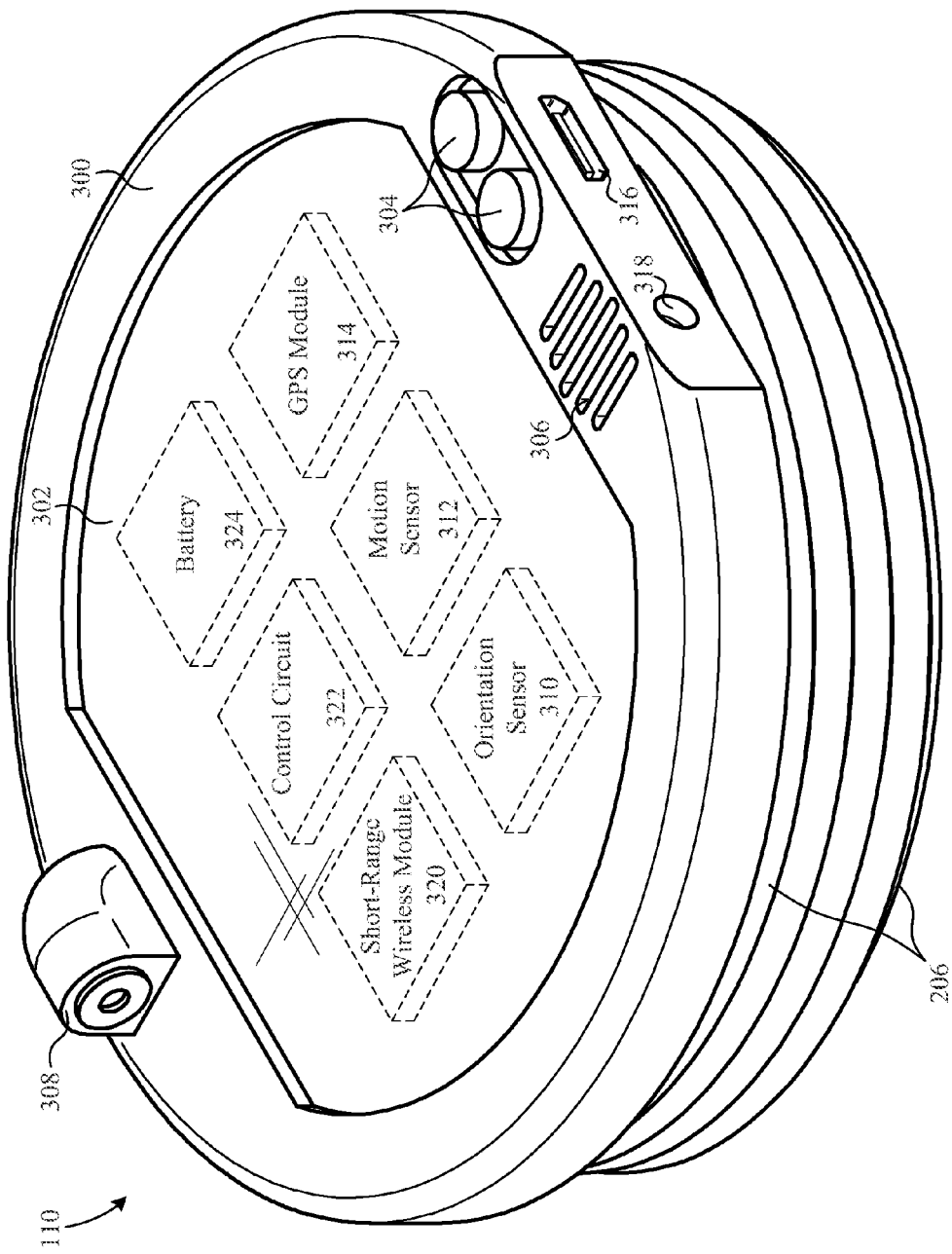
FIG. 3 is a perspective view of a display unit of the headphone system of FIG. 1.

FIG. 3 shows a perspective view of unit 110 according to one embodiment of the present invention. In addition to thread set 206 and contacts 210 (shown in FIG. 2), unit 110 further includes a housing 300 that supports a display screen 302, a set of user input buttons 304, a microphone 306, camera 308, an orientation sensor 310, a motion sensor 312, a global positioning system (GPS) module 314, a universal serial bus (USB) port 316, an auxiliary cable port 318, a short-range wireless module 320, a control circuit 322, and a battery 324.

In the example embodiment, display screen 302 is a touchscreen display screen operative to display visual contents in the form of both still images and/or video. Display screen 302 is further operative to receive user inputs via touch instructions. The contents displayed by display screen 302 can be predetermined content (e.g., music video, picture, etc.) and/or content generated in real-time via touch instructions. An example of content generated in real-time is drawing a line on display screen 302 by running a fingertip across display screen 302. Display screen 302 provides one optional means for inputting user control instructions to headphone system 100. For example, the volume of the audio signal output from speaker assemblies 108 could be adjusted by running a fingertip from the lower portion of display screen 302 toward the top of display screen 302. As another optional feature, display screen 302 can function as an additional user input device of external device 102. For example, a user could turn down the volume of external device 102 via touch instructions input through display screen 302.

User input buttons 304 are mechanical devices for inputting user control commands directly into headphone system 100. Optionally, user input buttons 304 can function as an additional user input device for inputting user control commands indirectly into external device 102. For example, buttons 304 can be used to pause an audio signal streaming from external device 102 to headphone system 100.

Microphone 306 is another input device for inputting user control commands directly into headphone system 100. In other words, microphone 306 enables a user to control unit 110 via voice/sound commands. For example, a user could instruct unit 110 to display an image of the artist of the song being played from speaker assemblies 108 by saying "display artist". As another example, a user could instruct camera 308 to capture a video by saying "record video". Similarly, microphone 306 can function as an additional user input device for inputting user control commands indirectly into external device 102. For example, a user could change the audio track being streamed from external device 102 by saying "next track". Microphone 306 can also be used by unit 110 to record sound or it can be an additional microphone from which external device 102 can record sound.

Camera 308 enables unit 110 to record digital video and/or still images. The user control of camera 308 can be done directly through input devices of unit 110 (i.e., display screen 302, buttons 304, microphone 306, orientation sensor 310, motion sensor 312). Optionally, the operation of camera 308 can be from external device 102.

Orientation sensor 310 is, for example, a microelectromechanical system (MEMS) gyroscope. Orientation sensor 310 provides several useful features to headphone system 100. For example, orientation sensor 310 allows unit 110 to detect its orientation so that it can adjust the orientation at which content is displayed from display screen 302. Another useful feature is that orientation sensor 310 operates as a user input device for controlling headset 100. For example, a user can raise and lower the audio volume of headphone system 100 by tilting their head in a first direction and an opposite second direction, respectively. As another example, a user can change the content displayed from display screen 302 by changing the orientation of their head. Another useful feature is that orientation sensor 310 operates as a user input device for controlling external device 102. For example, a user can adjust the ringer volume of external device 102 by changing the orientation of headphone system 100.

Motion sensor 312 is, for example, an accelerometer that provides several useful features to headphone system 100. One feature is that sensor 312 operates as a user input device for controlling headphone system 100. For example, a user can raise the audio volume of headphone system 100 by rapidly turning their head in a first direction and lower the volume by rapidly turning their head in the opposite second direction. The magnitude at which the volume changes can be proportional to the acceleration at which the user moves their head. A user can change and/or alter the content displayed from display screen 302 by moving their head. For example, a ball displayed by display screen 302 can appear to bounce off the peripheral edges of display screen 302 as a user shakes their head. Another useful feature is that motion sensor 312 operates as a user input device for controlling external device 102. For example, a user can choose to answer an incoming call to external device 102 by nodding their head in some predetermined fashion.

GPS module 314 is a conventional GPS module that enables headphone system 100 to carry out location sensitive functions. For example, GPS information supplied by a sensor in module 314 facilitates the output of location sensitive image, video, and audio contents. As another example, interactive headphone system 100 can play audio or display video/image information related to major events happening currently in the present location. As yet another example, interactive headphone system 100 can play/display information related to discounts or promotions in the vicinity, traffic information, severe weather information, etc., by interacting with authorized sources via the Internet.

In this particular embodiment, there are three optional external device interfaces through which headphone system 100 can communicate with an external device (i.e. external device 102), namely USB port 316, auxiliary cable port 318, and short-range wireless module 320. USB port 316 is adapted to receive a data cable (i.e. wire 104) through which data can be preloaded onto unit 110 or streamed in real-time. For example, media files (e.g., mp3 audio files, video files, image files, etc.) can be preloaded onto unit 110 from a computer (i.e. external device 102) through USB port 316. Optionally, USB port 316 can be a data port (e.g. HDMI port) through which media files can be streamed to unit 110 in real-time. Not only can USB port 316 facilitate data exchange between unit 110 and an external device, but it can also be used to supply power to unit 110. The power supplied to unit 110 can be to charge battery 324 and/or to supply unit 110 with direct operating power. Auxiliary cable port 318 is adapted to receive an auxiliary audio cable through which audio data is streamed to unit 110 from an external audio signal source (e.g. mp3 player). Short-range wireless module 320 provides a wireless link through which wireless data can be preloaded onto unit 110 and/or streamed in real-time. For example, media files can be preloaded onto unit 110 from a computer (i.e. external device 102) via short-range wireless module 320. Optionally, media files can be streamed to unit 110 in real-time from a computer via short-range wireless module 320.

Control circuit 322 provides overall coordination and control of the various functions of unit 110. Control circuit 322 is electrically coupled to display screen 302, buttons 304, microphone 306, camera 308, orientation sensor 310, motion sensor 312, GPS module 314, USB port 316, auxiliary cable port 318, short-range wireless module 320, and battery 324.

Figure 4:
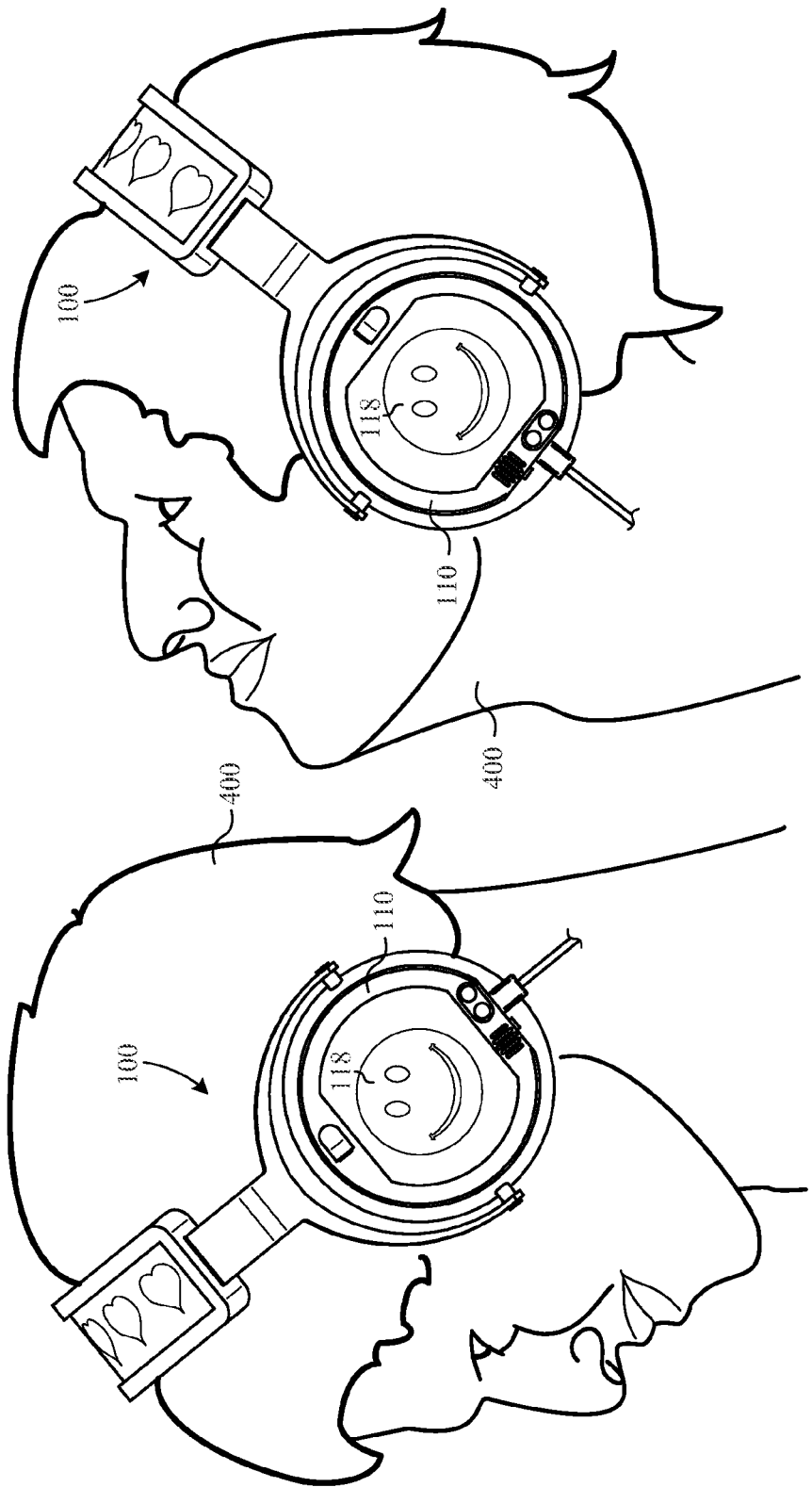
FIG. 4 is an illustration of the headphone system of FIG. 1 being worn by a user.

FIG. 4 illustrates an orientation correction feature of headphone system 100 by depicting display content 118 when a user 400 is looking down and looking up. As shown, the orientation of display content 118 remains correct regardless of the orientation of unit 110. As previously mentioned, orientation correction is facilitated by orientation sensor 310 (shown in FIG. 3). This particular feature is not only useful when the orientation of headphone system 100 is changed but also when the orientation of unit 110 is changed with respect to the rest of headphone system 100. For example, if unit 110 is partially unscrewed (e.g., 90 degrees) from recess 202, orientation sensor 310 will detect the orientation offset and the orientation of content 118 will be corrected.

Figure 5:
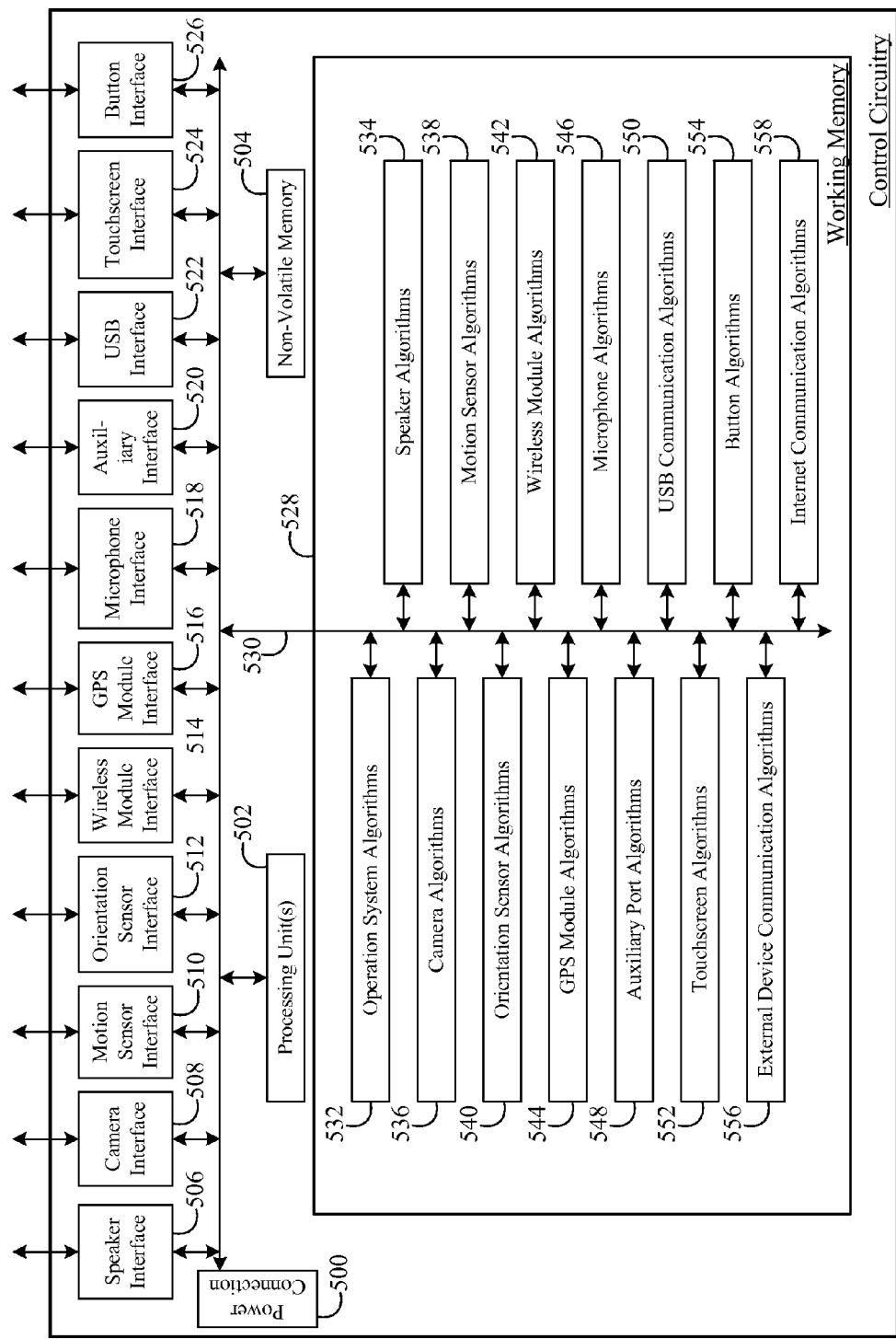
FIG. 5 is a block diagram of the control circuit of FIG. 3.

FIG. 5 is a block diagram of control circuit 322 according to one embodiment of the present invention. Control circuit 322 includes a power connection 500, one or more processing units 502, non-volatile memory 504, a speaker interface 506, a camera interface 508, a motion sensor interface 510, an orientation sensor interface 512, a wireless module interface 514, a GPS module interface 516, a microphone interface 518, an auxiliary cable interface 520, a USB cable interface 522, a touchscreen interface 524, a button interface 526, and a working memory 528 all interconnected via a system bus 530. Power connection 500 provides a means for electrically connecting control circuit 322 to battery 324 or some other source of operating power. Processing unit(s) 502 execute(s) data and code stored in working memory 528, causing headphone system 100 to carry out its various functions. Non-volatile memory 504 (e.g., read-only memory) provides storage for data and code (e.g., boot code and programs, digital audio files, image/video files, etc.) that are retained even when headphone system 100 is powered down. Speaker interface 506 provides a connection between unit 110 and the speakers of speaker assemblies 108. Camera interface 508 facilitates the electrical connection of camera 308 to control circuit 322. Motion sensor interface 510 facilitates the electrical connection of motion sensor 312 to control circuit 322. Orientation sensor interface 512 facilitates the electrical connection of orientation sensor 310 to control circuit 322. Wireless module interface 514 facilitates the electrical connection of short-range wireless module 320 to control circuit 322. GPS module interface 516 facilitates the electrical connection of GPS module 314 to control circuit 322. Microphone interface 518 facilitates the electrical connection of microphone 306 to control circuit 322. Auxiliary cable interface 520 facilitates the electrical connection of external devices (e.g. external device 102) to control circuit 322 indirectly through auxiliary cable port 318. USB interface 522 facilitates the electrical connection of external devices (e.g. external device 102) to control circuit 322 indirectly through USB port 316. Touchscreen interface 524 facilitates the electrical connection of display screen 302 to control circuit 322. Button interface 526 facilitates the electrical connection between buttons 304 and control circuit 322.

Working memory 528 (e.g., random access memory) provides temporary storage for data and executable code, which is loaded into working memory 528 during start-up and operation. Working memory 528 includes operating system algorithms module 532, speaker algorithms module 534, camera algorithms module 536, motion sensor algorithms module 538, orientation sensor algorithms module 540, wireless algorithms module 542, GPS algorithms module 544, microphone algorithms module 546, auxiliary port algorithms module 548, USB communication algorithms module 550, touchscreen algorithms module 552, button algorithm module 554, external device communication algorithms module 556, and an internet communication algorithms module 558.

The modules of working memory 528 provide the following functions. Operating system algorithms module 532 provides coordination and control of the various running programs and modules of headphone system 100. Speaker algorithms module 534 facilitates the output of analog audio signals from speaker interface 506 to speakers of speaker assemblies 108. Camera algorithms module 536 facilitates the operation (e.g., shutter operations, image processing/ storage, etc.) of camera 308. Motion sensor algorithms module 538 carries out various operations according to motion measurement signals captured by motion sensor 312. For example, motion sensor algorithms module 538 can output instructions to reduce the audio volume of headphone system 100 when motion sensor 312 measures some predetermined acceleration. Orientation sensor algorithms module 540 carries out various operations according to the orientation measured by orientation sensor 310. For example, orientation sensor algorithms module 540 can include an algorithm that outputs instructions to correct the orientation of contents displayed by display screen 302 when orientation sensor 310 senses that the orientation of unit 110 has been changed. Wireless algorithms module 542 facilitates wireless communication between headphone system 100 and wireless enabled devices such as, for example, external device 102, a wireless modem, etc. GPS algorithms module 544 facilitates the operation of and use of data from GPS module 314. Microphone algorithms module 546 performs operations based on audio signals measured/captured by microphone 306. For example, module 546 can include an algorithm that pauses the audio output from headphone system 100 in response to the word "Pause" being spoken into microphone 306. Auxiliary port algorithms module 548 facilitates communication between system 100 and external system 102 via a wire plugged into auxiliary cable port 318. USB communication algorithms module 550 facilitates communication between headphone system 100 and external system 102 via a wire (i.e. wire 104) plugged into USB port 316. Touchscreen algorithms module 552 facilitates the operation of display screen 302. Button algorithms module 554 is operative to carry out functions according to user instructions input to buttons 304. External device communication algorithms module 556 facilitates communication between headphone system 100 and external devices such as, for example, external device 102. Internet communication algorithms module 558 facilitates the connection of headphone system 100 to the internet.

Figure 6:
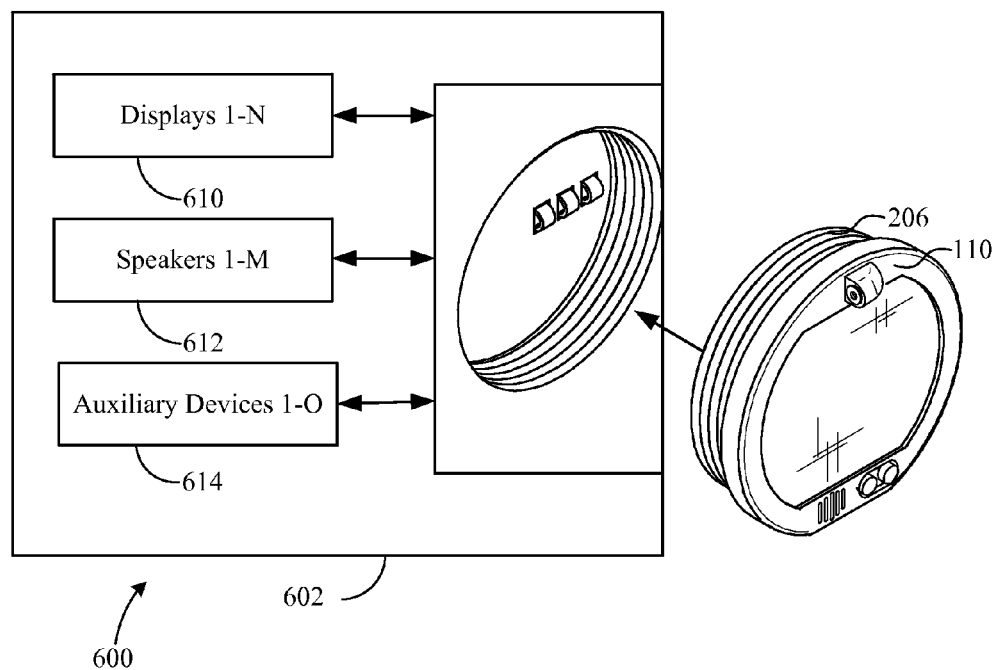
FIG. 6 is a representational image of an alternate assembly adapted to receive the display unit of FIG. 2.

FIG. 6 is a representational image of an alternate system 600, including display unit 110 and an alternate assembly 602 adapted to receive display unit 110. Example embodiments of alternate assembly 602 include, but are not limited to, a belt buckle, a carry bag, waist wear, a cap/hat, a jacket, other clothing, and other non-headphone systems. Similar to headphone system 100, alternate assembly 602 includes a set of displays 610, a set of speakers 612, and a set of auxiliary devices 614.

The description of particular embodiments of the present invention is now complete. Many of the described features may be substituted, altered or omitted without departing from the scope of the invention. For example, alternate display types (e.g., LED screen, LCDs, etc.), may be substituted for display screen 302. As another example, alternate data/power cable types (e.g. HDMI, micro USB, mini USB, etc.), may be substituted for wire 104. As yet another example, interactive display unit (e.g., display unit 206) can operate independently outside of a headphone environment. For example, display unit 206 can be removed from speaker assembly 108 and installed into other compatible assemblies of other types of devices including, but not limited to, belt buckles, carry bags, waist wear, a cap/hat, a jacket or other clothing, and so on. When installed in such alternative assemblies, the interactive display functions will continue to function, but perhaps with a different set of accessory functions (e.g., audio might be unnecessary). These and other deviations from the particular embodiments shown will be apparent to those skilled in the art, particularly in view of the foregoing disclosure.

We claim:

1. A headphone system comprising:
    a frame having a first region, a second region, and a headband extending between said first region and said second region;
    a first speaker assembly coupled to said first region of said frame and including a first thread set;
    a second speaker assembly coupled to said second region of said frame;
    a display;
    a user interface operative to receive input from a user;
    memory for storing data and code; and
    a controller coupled to said frame, responsive to said user input, and operative to execute said code and display images on said display when coupled to said frame based at least in part on said user input; and
    a first detachable display unit incorporating said controller, said memory, and said display and including a complementary second thread set, said first thread set and said second thread set facilitating the engagement of said first display unit with said first speaker assembly.

2. The headphone system of claim 1, wherein said user interface includes a data communication interface operative to facilitate data communication between said headphone system and an external system.

3. The headphone system of claim 2, wherein:
said user interface includes an input sensor coupled to said frame; and
said controller responsive to input from said input sensor is operative to provide control signals to said external device via said data communication interface.

4. The headphone system of claim 2, wherein said controller is operative to control said headphone system based at least in part on instructions received from said external system via said data communication interface.

5. The headphone system of claim 4, wherein said data communication interface is configured to receive audio control instructions from said external system.

6. The headphone system of claim 4, wherein said data communication interface is operative to receive display control instructions from said external system.

7. The headphone system of claim 4, further comprising a camera system, and wherein said communication interface is configured to receive camera control instructions from said external system.

8. The headphone system of claim 4, wherein said controller and said communication interface facilitate real-time control of said headphone system by said external system.

9. The headphone system of claim 2, wherein said data communication interface is configured to communicate with said external system via a wired connection.

10. The headphone system of claim 2, wherein said data communication interface includes a wireless system configured to communicate with said external system.

11. The headphone system of claim 2, wherein said data communication interface is configured to receive audio signals from said external system, and said first speaker assembly is operative to output sound indicative of said audio signals in real-time.

12. The headphone system of claim 2, wherein said controller is configured to:
receive digital audio data via said data communication interface; and
store said digital audio data in said memory.

13. The headphone system of claim 2, wherein:
said data communication interface is configured to receive display signals from said external system; and
said controller is configured to display images on said display based on said display signals in real-time.

14. The headphone system of claim 2, wherein said controller is configured to:
receive display data via said communication interface; and
store said display data in said memory.

15. The headphone system of claim 1, wherein said first speaker assembly includes a first electrical contact, and said first detachable display unit includes a complementary second electrical contact, said first electrical contact and said complementary second electrical contact being adapted to electrically contact one another.

16. The headphone system of claim 15, wherein:
said first detachable display unit is adapted to rotate relative to said first speaker assembly about an axis when said first detachable unit is attached to said first speaker assembly;
one of said first electrical contact and said complementary second contact includes a substantially annular electrical conductor formed at least partially about said axis, said annular conductor being adapted to slidably engage the other of said first electrical contact and said complementary second electrical contact while said first detachable display unit is being rotated with respect to said first speaker assembly; and
the other of said first electrical contact and said complementary second electrical contact is a conductive biasing member adapted to exert force on said annular conductor, said force being sufficient to maintain electrical contact with said annular conductor while said first detachable display unit is being rotated with respect to said first speaker assembly.

17. The headphone system of claim 1, further comprising:
a second display; and
a second detachable display unit including said second display.

18. The headphone system of claim 17, wherein said first display unit and said second display unit are cooperatively controlled by said controller.

19. The headphone system of claim 17, wherein:
said second detachable display unit is adapted to engage said second speaker assembly; and
said headphone system further includes a third display unit having a third display and being coupled to a headband portion of said frame.

20. The headphone system of claim 19, wherein said display, said second display, and said third display are cooperatively controlled by said controller.

21. The headphone system of claim 1, wherein said first detachable display unit is adapted to mount to alternate non-headphone systems.

22. The headphone system of claim 1, wherein said controller is operative to display static content on said display.

23. The headphone system of claim 1, wherein said controller is operative to display video on said display.

24. The headphone system of claim 1, further comprising a camera coupled to said frame.

25. The headphone system of claim 1, further comprising a second display.

26. The headphone system of claim 25, wherein said display and said second display are cooperatively controlled by said controller.

27. The headphone system of claim 25, wherein:
said display is coupled to said frame via said first speaker assembly;
said second display is coupled to said frame via said second speaker assembly; and
said headphone system further includes a third display coupled to said headband of said frame.

28. The headphone system of claim 27, wherein said display, said second display, and said third display are cooperatively controlled by said controller.

29. The headphone system of claim 1, wherein a second display is coupled to said frame via said second speaker assembly.

30. The headphone system of claim 1, wherein:
said user interface includes an input sensor coupled to said frame; and
wherein said controller is operative to control said headphone system based at least in part on input from said input sensor.

31. The headphone system of claim 30, wherein said controller displays images on said display based at least in part on said input from said input sensor.

32. The headphone system of claim 30, wherein said controller controls the operation of at least one of said first speaker assembly and said second speaker assembly based at least in part on said input from said input sensor.

33. The headphone system of claim 30, further comprising:
a camera system; and wherein
said controller controls the operation of said camera based at least in part on said input from said input sensor.

34. The headphone system of claim 30, wherein said input sensor is a sound sensor.

35. The headphone system of claim 30, wherein said input sensor is an orientation sensor.

36. The headphone system of claim 35, wherein said orientation sensor includes a gyroscope.

37. The headphone system of claim 35, wherein said orientation sensor includes an accelerometer.

38. The headphone system of claim 30, wherein said input sensor is a motion sensor.

39. The headphone system of claim 38, wherein said motion sensor includes a gyroscope.

40. The headphone system of claim 38, wherein said motion sensor includes an accelerometer.

41. The headphone system of claim 30, wherein said input sensor is a manual user input device.

42. The headphone system of claim 41, wherein said input sensor and said display are integral parts of a touchscreen display.

43. The headphone system of claim 30, wherein:
said input sensor generates output indicative of the orientation of said display; and
said controller is configured to automatically adjust the orientation of images displayed on said display based at least in part on said output of said input sensor.

44. The headphone system of claim 30, wherein said controller responsive to signals from said input sensor is operative to provide control instructions to said external device, whereby a user can control said external device via said headphone system.

45. The headphone system of claim 44, wherein said control instructions include audio instructions.

46. The headphone system of claim 1, further comprising a location determining device.

47. A method for manufacturing headphones, said method comprising:
providing a frame having a first region, a second region, and a headband extending between said first region and said second region;
coupling a first speaker assembly to said first region of said frame, said first speaker assembly including a first thread set;
coupling a second speaker assembly to said second region of said frame;
assembling a user interface, memory, a display and a controller into a display unit having a complementary second thread set; and
coupling said display unit to said frame by engaging said first thread set of said first speaker assembly with said second thread set of said display unit; and wherein
said controller is operative to display images on said display when said display unit is coupled to said frame.

48. The method of claim 47, wherein:
said second speaker assembly includes a third thread set; and further comprising
providing a second display unit including a display and a fourth complementary thread set; and
coupling said second display unit to said frame by engaging said fourth complementary thread set of said second display unit with said third thread set of said second speaker assembly.

49. The method of claim 48, further comprising:
providing a third display; and
coupling said third display to said headband.

50. The method of claim 49, further comprising electrically coupling said first display unit, said second display unit, and said third display to facilitate the communication of display data from said controller to said second display unit and said third display.

51. The method of claim 47, further comprising:
providing a set of annular electrical conductors on one of said first display unit and said first speaker assembly; and
providing complementary set of electrical contacts adapted to engage said annular conductors on the other of said first display unit and said first speaker assembly.

52. The method of claim 47, wherein said complementary second thread set is formed on a peripheral portion of a housing of said display unit.

* * * * *